Aug. 17, 1971     H. G. NÖLLER     3,600,134
METHOD FOR THE DETERMINATION OF ALCOHOL AND OTHER
OXIDIZABLE ORGANIC COMPOUNDS IN RESPIRED AIR
AND BODY FLUIDS

Filed April 11, 1968     2 Sheets-Sheet 1

INVENTOR.
Hans G. Nöller
BY
*Walter E. Johnson*
ATTORNEY

3,600,134
METHOD FOR THE DETERMINATION OF ALCOHOL AND OTHER OXIDIZABLE ORGANIC COMPOUNDS IN RESPIRED AIR AND BODY FLUIDS
Hans Gunter Nöller, Raleigh, N.C., assignor to Corning Glass Works, Corning, N.Y.
Filed Apr. 11, 1968, Ser. No. 720,736
Int. Cl. G01n 25/22
U.S. Cl. 23—232E
23 Claims

ABSTRACT OF THE DISCLOSURE

A method and apparatus for determining oxidizable organic compounds in human and animal body gases and fluids. Gases to be tested are introduced, together with excess oxygen, into a vessel containing a heated metal catalyst. The resulting changes in electro-physical values of the catalyst, e.g., temperature and resistance, which are dependent on the concentration of oxidizable compounds contained in the gas, are measured to provide an indication of the concentration of the oxidizable compounds.

BACKGROUND OF THE INVENTION

The determination of the alcohol content in the human organism is of a steadily increasing importance in connection with traffic offenses. The Widmark determination as well as the enzymatic ADH method according to Bucher and Redetzki represent test methods which are being almost exclusively used in Germany at present for the determination of alcohol. These methods entail, however serious disadvantages which have become common knowledge as the result of both scientific publications and daily press reports.

In carrying out the Widmark determination according to the prescribed procedure, a great number of precautions must be observed. Alcohol content is determined in the blood and thus presupposes the taking of a blood sample, thereby causing a sufferance of bodily harm on the part of the person in question. In countries where the personal freedom of the individual as guaranteed by law does not permit such measures (e.g., in England and U.S.A.), that is, where a participant in traffic cannot be legally forced to submit to the taking of a blood sample, the authorities must revert to the determination of alcohol content in respired air.

The determination of alcohol in respired air by chemical means is time-consuming, complicated and, in addition, this method has been quite inaccurate. In Germany a similar and still less reliable method (alcohol blowpipes, alcohol balloons, etc.) is used in order to obtain a rough idea whether alcohol content in blood can be suspected; that is, whether the carrying out of the Widmark test, which is connected with bodily harm, is necessary.

For quite some time a great variety of unsuccessful attempts have been made to find a reliable, quantitative, simple and fast method for the determination of alcohol. Almost all of these suggested methods were of a chemical nature.

SUMMARY OF THE INVENTION

It is therefore an object of this invention to provide a method for quickly and accurately determining the amount of an oxidizable substance in a body gas or fluid.

The present invention deals with the solution of the above problems by electronic means. Briefly, the method of this invention is practiced by introducing a gas to be tested, along with oxygen, into a vessel containing a heated metal catalyst. The resulting electro-physical changes in the catalyst, which are dependent on the concentration of oxidizable compounds in the gas, are detected by appropriate electronic means.

DETAILED DESCRIPTION

This invention is based on the following principle. Oxidation occurs when gas to be tested, along with excess oxygen, passes a heated catalyst. Due to this exothermic reaction the temperature of the catalyst increases to an extent which is dependent on the amount of the oxidizable substance in the gas. This increase in temperature quantitatively results in (1) an increase in the ionization current flowing between the catalyst and another closely spaced electrode, and (2) in an increased electrical resistance of the catalyst.

In accordance with this invention, the phrase "body gas" includes such gases as alcohol, acetone, ether, methane or the like which may be contained in such body substances as air, blood, urine or other body fluids.

Figure 1:
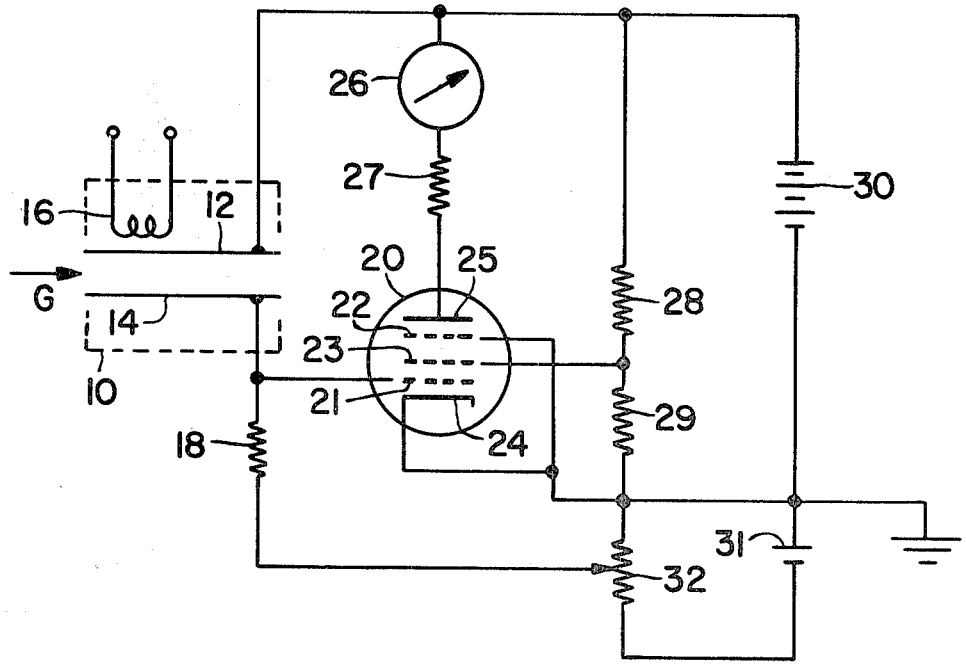
FIG. 1 is a schematic diagram of a circuit for determining a change in ionization current between two electrodes, one of the electrodes being a catalyst which is located in the vicinity of a gas containing an oxidizable compound.

Referring to FIG. 1 there is shown a schematic diagram of a simple device which may be used for the determination of acetone content in respired air, this device being suitable for conditions as found in practice. A measuring cell or ionization tube which is defined by the dashed lines 10 is shown to include a pair of closely spaced electrodes, a platinum anode 12 and a metallic cathode 14. The anode 12 is heated by a filament 16. The ionization current flowing between the platinum anode 12 and the cathode 14 causes a voltage drop across a resistor 18, one terminal of which is connected to the control grid 21 of a pentode 20. This pentode is biased in a conventional manner, the suppressor grid 22 being connected to the cathode 24 and the screen grid 23 being connected to a high positive potential which is determined by a voltage divider consisting of the resistors 28 and 29. The plate 25 of the pentode is connected to a microammeter 26 by a resistor 27. The B+ voltage for the amplifier and the ionization voltage for the ionization tube 10 are both supplied by a DC source 30. A grid-bias source 31 is connected across a potentiometer 32, the tap of which is connected to the resistor 18. The potentiometer 32 is adjusted so that no current will flow through the meter 26 when no oxidation takes place in the ionization tube 10.

When a gas (represented by the arrow G) containing an oxidizable compound and an excess of oxygen is blown into the ionization tube 10, the ionization current is increased correspondingly due to an increase in temperature at the surface of the platinum anode 12 as a result of the oxidation. This ionization current causes a voltage drop across the resistor 18 which is amplified by the pentode 20. The reading of the meter 26 will be related to the amount of the oxidizable substance which flows in the ionization tube per unit time. The device thus described is capable of detecting a concentration of such oxidizable compounds as alcohol, acetone, methane and the like. The amount of oxygen required for this catalyst-furthered oxidation is merely that amount which is present in expired air.

EXAMPLE I

The circuit of FIG. 1 was constructed using components having the following values.

TABLE I

Resistor 18—5M ohm
Resistor 27—1M ohm
Resistor 28—200K ohm
Resistor 29—100K ohm
Resistor 32—50K ohm pot.
Meter 26—Microammeter (50 μa.)
Pentode 20—6084
Source 30—300 v. DC
Source 31—20 v. DC The instrument so constructed was tested in the following manner. Expired air obtained from a child with fresh and heavy acetonemic vomiting was blown into the ionization tube 10 in the amount of 200 ml. over a period of 10 seconds. The indicator of meter 26 moved from 0 to 45 μa. during the blowing and then returned to 0 again.

In the case of a child admitted to the hospital ten hours prior to a similar test and treated in the meantime by being given glucose intravenously, the indicator reading was only 16 μa. For comparison purposes, the introduction of the expired air of the person who brought the child to the hospital left the indicator at 0.

Figure 2:
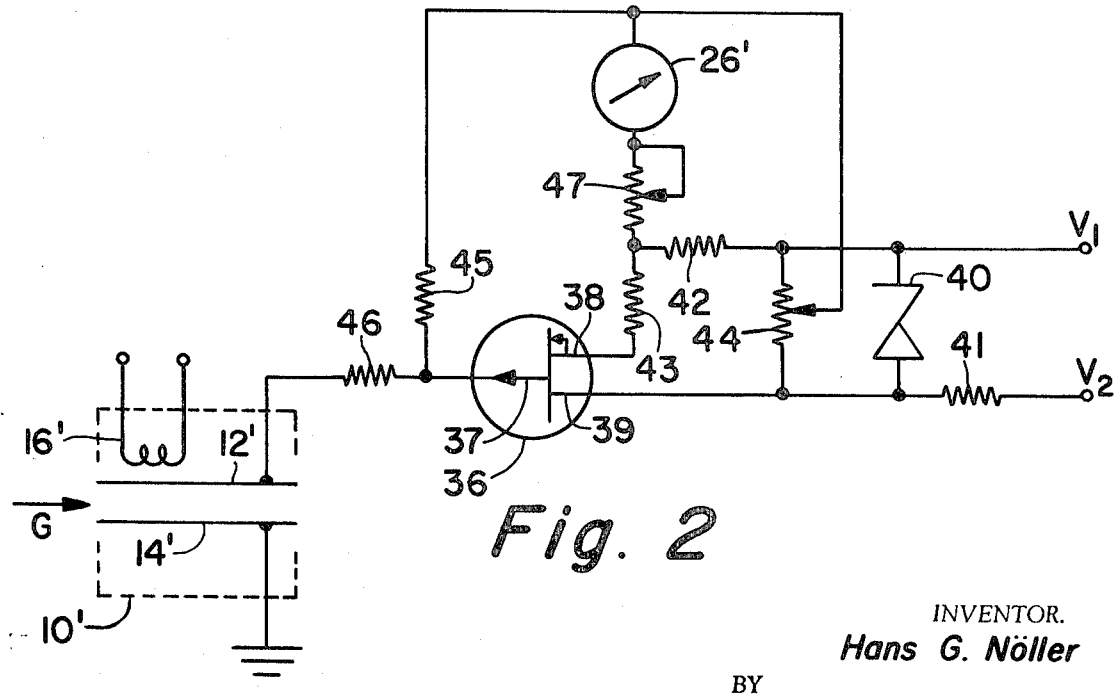
FIG. 2 is a schematic diagram of an instrument which employs a field-effect transistor amplifier to perform a function which is similar to that of the circuit of FIG. 1.

FIG. 2 is a schematic diagram of an instrument which functions in a manner which is similar to that of FIG. 1. In this device, however, a field-effect transistor is used instead of a vacuum tube to amplify the ionization current.

Components in FIG. 2 which are identical to those of FIG. 1 are identified by primed reference numerals. The instrument shown in FIG. 2 includes a field-effect transistor 36 having a gate electrode 37, a source electrode 38, and a drain electrode 39. A Zener diode 40 and a resistor 41 which are connected in series across the DC voltage sources, $V_1$ and $V_2$, provide a constant voltage source for the field-effect transistor. The drain electrode 39 is connected to one terminal of the Zener diode 40 while the source electrode 38 is connected to the other terminal of the Zener diode through the series combination of resistors 42 and 43. The cathode 14' is connected to a source of reference potential. The anode 12' is connected by a voltage divider consisting of the resistors 45 and 46 to the tap of a potentiometer 44 which is then connected across the Zener diode 40. The ionization voltage applied to the anode 12' is determined by the position of the tap of the potentiometer 44. The gate electrode 37 is connected to the junction of the resistors 45 and 46. One terminal of the ammeter 26' is connected to the tap of the potentiometer 44, the other terminal thereof being connected to the junction between the resistors 42 and 43 by a variable resistor 47, which is provided for calibration purposes.

As stated hereinabove, the ionization current flowing between the anode 12' and the cathode 14' is related to an amount of oxidizable substance which flows in the ionization tube per unit time. This ionization current causes a voltage drop to occur across the very high resistance voltage divider consisting of the resistors 45 and 46. Due to the almost wattless amplification of the field-effect transistor, which has a very high input impedance, it is possible to measure this voltage drop. By a proper adjustment of the balancing voltage on the potentiometer 44, the zero position of the microammeter 26' can be obtained for the condition during which no oxidizable gas is present within the ionization tube 10'.

When respired air containing an oxidizable gas such as acetone, alcohol, methane or the like is blown between the electrodes 12' and 14', both the ionization current between the two electrodes and the voltage drop occurring across the resistor 45 are increased due to the oxidation in the ionization cell. Accordingly, the indicator of the microammeter 26' will vary in accordance with the concentration of the oxidizable gas.

When identical test conditions (especially identical tube diameters, identical velocity of flow, and uniform increase in temperature of the gas to be tested) are maintained, then the indicator reading is strictly dependent on the concentration of the oxidizable compound contained in the gas being tested.

EXAMPLE II

The circuit of FIG. 2 was constructed using components having the following values.

TABLE II

Field-effect transistor 36—2N3368
Resistor 41—330 ohm
Resistor 42—10K ohm
Resistor 43—1K ohm
Resistor 44—3K ohm pot.
Resistor 45—22M ohm
Resistor 46—22M ohm
Resistor 47—50K ohm pot.
Diode 40—10 v. Zener diode
$V_1$—+300 v.
$V_2$—+280 v.
Meter 26—Microammeter (50 μa.)

The instrument so constructed was tested on a patient and yielded the same precise measuring results that were indicated in Example I.

Figure 3:
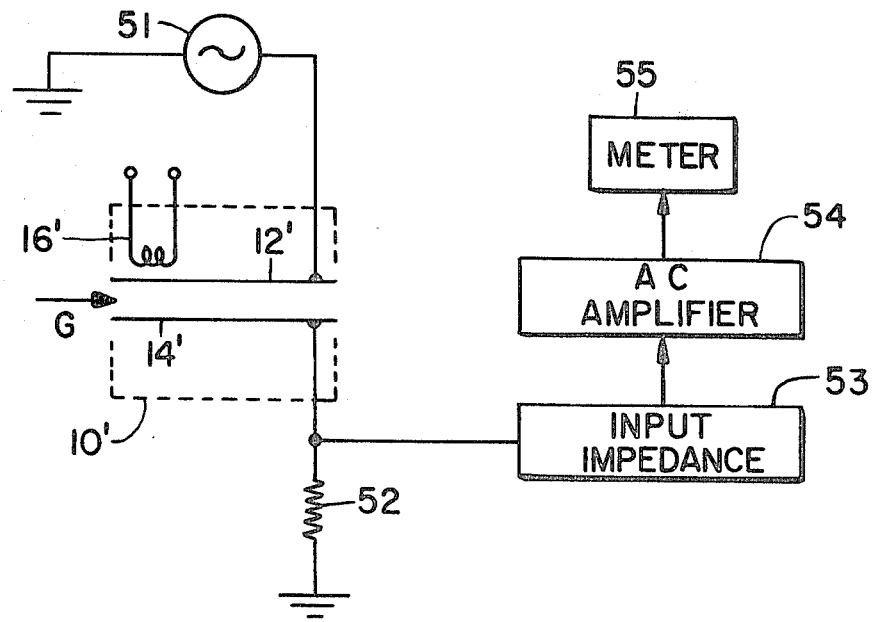
FIG. 3 is a schematic diagram which illustrates the use of an AC source and an AC amplifier which may replace the DC source and amplifier of FIGS. 1 and 2.

This invention is not limited to the DC instruments described in connection with FIGS. 1 and 2. A simple tube-equipped or transistorized alternating voltage or alternating current amplifier can also be used to determine the ionization current between the two electrodes of the ionization tube. As shown in FIG. 3 an AC source 51 is connected to the anode 12', the cathode 14' being connected to a source of reference potential by a resistor 52. The source 51 may supply an AC voltage or a pulsating DC voltage. The potential occurring at the cathode 14' is connected to the amplifier 54 by an input impedance 53 which may consist of a suitable connecting means such as a capacitor, a diode, a resistor or the like. In a manner similar to that described in connection with the operation of FIGS. 1 and 2, the meter 55 can give a direct indication of the ionization current flowing between the electrodes 12' and 14'.

Figure 4:
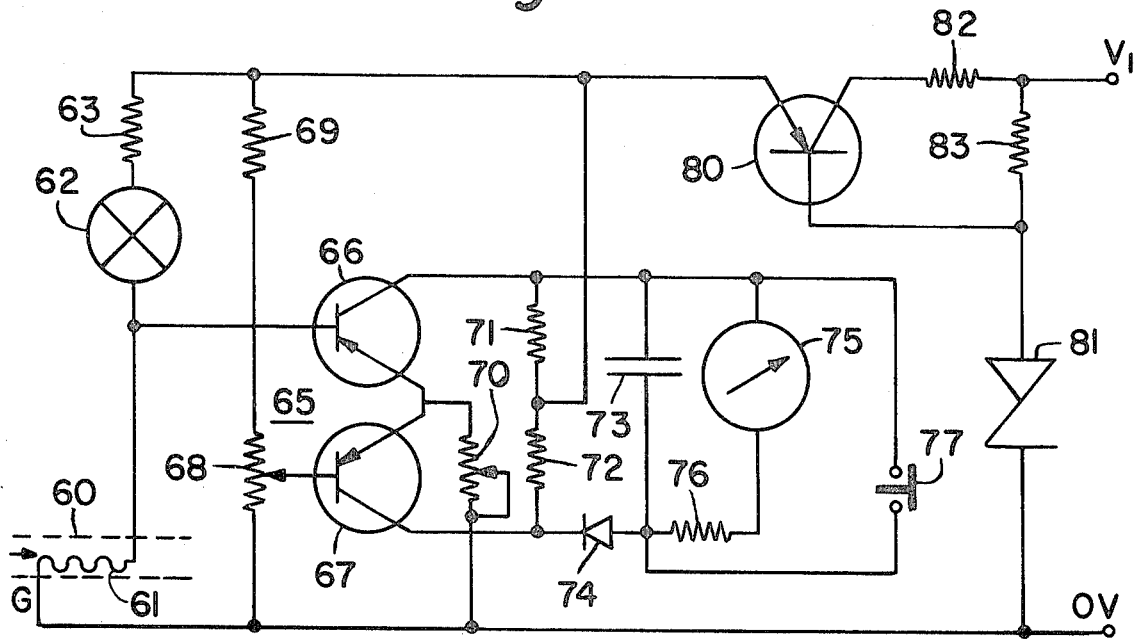
FIG. 4 is a schematic diagram of a circuit for determining the change in resistance of a catalyst due to the presence of an oxidizable compound in the vicinity thereof.

FIG. 4 shows a schematic diagram of an instrument which is based on the principle that the electrical resistance of a platinum wire will increase in response to an increase in the amount of oxidizable compound adjacent thereto. This circuit consists of four component groups: a measuring or sensing device, an amplifier, an integrator and a voltage stabilizer.

The resistance of a spiral of platinum wire 61 which is located within the measuring cell 60 determines the amount of current flowing in a measuring circuit including a filament type lamp 62 and a resistor 63 which are connected in series with the platinum wire 61. The lamp 62 functions as a cold conductor and could be replaced by a suitable iron-hydrogen resistor, the resistance of the lamp being proportional to the current flowing therethrough, the lamp being a non-linear resistance element.

DC voltage amplifier 65 amplifies the voltage changes occurring in the measuring circuit and includes transistors 66 and 67. A bias voltage for the base of the transistor 67 is provided by the series connection of a potentiometer 68 and a fixed resistor 69, the tap of the potentiometer 68 being connected to the base of the transistor 67. The emitter bias voltage for the two transistors is provided by a variable resistor 70. The variable voltage occurring in the sensing device is coupled to the amplifier 65 by way of a connection between the ungrounded end of the platinum wire 61 and the base of the transistor 66. The amplified voltage appears across the load resistors 71 and 72. The arrangement of the transistors 66 and 67 assists in the compensation for measuring errors due to changes in supply voltage and temperature.

A transistorized Wheatstone bridge is formed by the circuit thus described. The four arms of the bridge consist of: (1) the platinum wire 61, (2) resistor 63 and the lamp 62, (3) the portion of the potentiometer 68 between the tap and the platinum were 61, and (4) the remaining portion of the potentiometer 68 and the resistor 69. The quantitative potential difference between the collectors of the transistors 66 and 67, which results from an oxidation occurring in the vicinity of the platinum wire 61, charges a large valued capacitor 73 by way of a diode 74, a unidirectional conduction means. This diode prevents the discharge of the capacitor through the transistors 66 and 67 when the voltage at the collectors thereof becomes lower than the voltage across the capacitor 73. A sensitive microammeter 75, which is connected across the capacitor 73 by way of a high-resistance resistor 76, indicates the charge condition of this capacitor.

A voltage stabilizer circuit consisting of a transistor 80, a Zener diode 81, and resistors 82 and 83 eliminates changes in the function of the instrument when supply voltage fluctuations take place.

Figure 5:
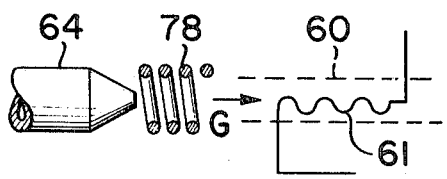
FIG. 5 is a portion of the schematic diagram of FIG. 4 diagrammatically illustrating means for heating a gas emitted from a nozzle prior to its entering the measuring tube.

The operation of the circuit described in connection with FIG. 4 is as follows. Respired air is introduced into a balloon (not shown) which is made of a semi-elastic material. The balloon is then exhausted by way of nozzle 64, shown alternatively in FIG. 5, to provide a quasiconstant flow velocity through the measuring tube 60. In order to obtain a uniform temperature of the gas to be tested, a self-regulating heating device 78, as also shown in FIG. 5, may be mounted directly in front of the nozzle.

Oxidation of the alcohol, acetone or other oxidizable gas contained in the respired air causes the temperature as well as the resistance of the platinum spiral 61 to change. This change in resistance varies the voltages in the Wheatstone bridge, thereby changing the voltage input to the amplifier 65. As a result, a potential difference which is dependent exclusively on the concentration of the oxidizable gas flowing through the measuring tube 60 will appear at the collectors of the transistors 66 and 67. This potential difference can be used for a direct reading of the instantaneous concentration in the respired air of an oxidizable gas such as alcohol, acetone, methane or the like.

An integration of the total amount of oxidizable gas in the volume being tested is determined by the charge on the capacitor 73. Since the series connection of the ammeter 75 and the high-resistance resistor 76 subjects the capacitor 73 to a minimum load, the deflection of the pointer will remain unchanged at maximum indication for some time (minutes) before the pointer goes very slowly back to zero. Momentarily closing a switch 77 short circuits and discharges the capacitor 73 and thereby returns the pointer of the ammeter 75 rapidly back to zero.

EXAMPLE III

The circuit of FIG. 4 was constructed using components having the following values.

TABLE III

Transistor 66=AF 117 (germanium PNP)
Transistor 67=AF 117 (germanium PNP)
Transistor 80=2N627
Lamp 62=12 v. 22 w.
Resistor 63=2 ohm
Resistor 69=5K ohm
Resistor 68=2K ohm pot.
Resistor 70=100 ohm pot.
Resistor 72=100 ohm
Resistor 71=100 ohm
Resistor 76=100K ohm
Resistor 82=1 ohm
Resistor 83=50 ohm
Diode 81=9.1 v. Zener diode
Capacitor 73=7500 μf.
Meter 75=Microammeter (25 μa.)

To liters of respired air from a sober person and two liters of air from a person who drank four glasses of beer during the preceding hour were tested by means of the instrument schematically illustrated in FIG. 4. In the case of the sober person there was no pointer deflection. On the other hand, the blowing of the respired air sample of the person who was under the influence of alcohol through the measuring tube 60 resulted in an indicator reading of 21 μa.

In addition to the determination of alcohol contents the same method can be applied for the quantitative determination of acetone contents in respired air, no special measures having to be taken. If a filter which prevents the passage of either alcohol or acetone is placed inside the gas channel, then it will be possible to measure only one component even if both gases are present.

The same method can also be used for the determination of organic oxidizable substances in body fluids. The determination of alcohol contents in blood, a method which is complicated and highly time-consuming in the case of the Widmark test, can be achieved by means of the electronic technique by simply converting alcohol or the other oxidizable substances to be determined into the gas phase.

The alcohol content in 1 ml. of blood roughly corresponds to that in 2 liters of expired air (see, for example, H. Elbel: Blood Alcohol, 2nd ed., Georg Thieme Verlag, 1956). A sample of blood (generally 0.1 ml.) is introduced immediately upon the taking thereof into a plastic bag which has been inflated to 2 liters and which serves as desiccator. Anhydrous $CuSO_4$ which serves as dehydrating agent is placed at the bottom of this bag. No chemical reaction takes place between $CuSO_4$ and alcohol, and $CuSO_4$ does not absorb any alcohol. Accordingly, the blood dries very rapidly. The entire gas from the bag is then driven through the tube 60 with the heated platinum wire 61, in the same manner as in the above example relating to respired air. Thus a quantitative determination of alcohol in blood is obtained very rapidly.

A very similar procedure is used for the determination of acetone in blood or urine. In a similar way even methane gas (lung and circulatory system tests) can be quantitatively determined in blood.

For the determination of the resistance of the platinum wire 61, which is dependent on oxidation, a simple tubeequipped or transistorized alternating voltage amplifier or AC amplifier can be used instead of the direct voltage amplifier shown in FIG. 4, provided the platinum wire 61 as well as the resistor 63 are supplied with alternating current or with pulsating direct current instead of with direct current. Thus, an AC amplifier arrangement similar to that shown in FIG. 3 can be connected in such a manner that the input thereof is connected to the ungrounded terminal of the platinum wire 61.

I claim:
1. A method for determining the amount of any ox- idizable organic compound or compounds present in a human or animal body gas comprising providing a vessel containing a metal catalyst, providing a non-linear resistance element in series with said catalyst, heating said metal catalyst with electrical current passing through said non-linear resistance element and said catalyst, heating said gas including excess oxygen to a substantially constant temperature, introducing said heated gas with excess oxygen into said vessel, sensing the change in resistance of said catalyst resulting from introducing said gas with excess oxygen into said vessel, amplifying said resistance change, and thereafter displaying the amplified resistance change, said change being a function of the concentration of said oxidizable compound or compounds in said body gas and being caused by the resulting catalyst furthered non-combustion oxidation of said body gas whereby the amount of any oxidizable organic compound or compounds therein is determined.

2. The method of claim 1 wherein said gas is introduced into said vessel at a substantially constant flow rate.

3. The method of claim 2 further comprising the step of storing said sensed and amplified change so that said displaying may continue beyond the period during which said body gas remains in said vessel.

4. A method for determining the amount of any oxidizable organic compound or compounds present in a human or animal body gas comprising providing a vessel containing a metal catalyst, providing a metallic electrode, heating said metal catalyst by external means, applying a voltage between said catalyst and said electrode and thus causing an ionization current to flow therebetween, introducing said gas with excess oxygen into said vessel, sensing the change in ionization current flowing between said catalyst and said electrode resulting from introducing said gas with excess oxygen into said vessel, amplifying said change in ionization current, and thereafter indicating said amplified change, said change being a function of the concentration of said oxidizable compound or compounds in said body gas and being caused by the resulting catalyst furthered non-combustion oxidation of said body gas whereby the amount of any oxidizable organic compound or compounds therein is determined.

5. The method of claim 4 wherein said catalyst is a platinum electrode, said change resulting from an increase in temperature at the surface of said platinum electrode from said non-combustion oxidation.

6. The method of claim 4 further comprising the step of adjusting said voltage so that no ionization current will flow between said catalyst and said electrode prior to introducing said body gas with excess oxygen into said vessel.

7. An instrument for detecting the amount of any oxidizable organic compound or compounds in a human or animal body gas comprising a chamber for receiving said body gas, said chamber having at least a first opening into which said gas can be introduced, a metal catalyst disposed within said chamber, means for heating said catalyst, means for heating said gas to a constant temperature, means for introducing said heated gas with excess oxygen into said chamber, means for sensing the change in resistance of said catalyst, means for amplifying said resistance change connected to said catalyst, a non-linear resistance element connected in series with said catalyst, an input electrode of said amplifying means being connected to the junction of said non-linear resistance element and said catalyst, and indicating means connected to the output of said amplifier means to indicate said resistance change, said change being a function of the concentration of said oxidizable compound or compounds in said body gas and being caused by the resulting catalyst furthered non-combustion oxidation of said body gas whereby the amount of any oxidizable organic compound or compounds therein is determined.

8. An instrument for detecting the amount of any oxidizable organic compound or compounds in a human or animal body gas comprising a chamber for receiving said gas, said chamber having at least a first opening into which said gas can be introduced, a metal catalyst disposed within said chamber, means for heating said catalyst, amplifier means, a non-linear resistance element connected in series with said catalyst, an input electrode of said amplifier means being connected to the junction of said non-linear resistance element and said catalyst, and indicating means connected to the output of said amplifier means to indicate a change in the resistance of said metal catalyst resulting from the presence of any oxidizable organic compound or compounds in said gas within said chamber, whereby the amount of any oxidizable organic compound or compounds in said gas is determined.

9. The instrument of claim 8 wherein said metal catalyst is formed of platinum.

10. The instrument of claim 8 wherein said metal catalyst is connected as one leg of a Wheatstone bridge, said non-linear resistance element being at least a part of another leg of said Wheatstone bridge, and said amplifier means comprising a direct voltage amplifier having a pair of output electrodes.

11. The instrument of claim 10 further comprising means for integrating the voltage appearing across said output electrodes.

12. The instrument of claim 11 further comprising unidirectional conduction means connected in series with said integrating means for preventing the discharge of said integrating means through said amplifier.

13. The instrument of claim 12 wherein said integrating means comprises a capacitor, said instrument further comprising a resistor connecting said indicating means to said capacitor and providing said capacitor with a high impedance discharge circuit.

14. The instrument of claim 13 further comprising means for applying a constant bias voltage to said amplifier.

15. The instrument of claim 14 wherein said bias means is connected to the series circuit including said non-linear resistance element and said metal catalyst.

16. The instrument of claim 15 further comprising low impedance means for discharging said capacitor.

17. An instrument for detecting the amount of any oxidizable organic compound or compounds in a human or animal body gas comprising a chamber for receiving said body gas, said chamber having at least a first opening into which said gas can be introduced, a metal catalyst disposed within said chamber, a metal electrode disposed within said chamber adjacent said catalyst, external means for heating said catalyst, means for applying a voltage between said catalyst and said electrode and thus causing an ionization current to flow therebetween when said body gas containing an oxidizable organic compound or compounds is present within said chamber, means for introducing said body gas with excess oxygen into said chamber, means for sensing the change in ionization current flowing between said catalyst and said electrode resulting from introducing said gas with excess oxygen into said vessel, means for amplifying said change in ionization current, and means for indicating said amplified change connected to the output of said amplifier means, said change being a function of the concentration of said oxidizable compound or compounds in said body gas and being caused by the resulting catalyst furthered non-combustion oxidation of said body gas whereby the amount of any oxidizable organic compound or compounds therein is determined.

18. The instrument of claim 17 wherein said catalyst is a platinum electrode, said change in ionization current resulting from an increase in temperature at the surface of said platinum electrode from said non-combustion oxidation.

19. The instrument of claim 18 further comprising the means for adjusting said voltage so that no ionization current will flow between said catalyst and said electrode prior to introducing said body gas into said vessel.

20. The instrument of claim 18 wherein said means for applying a voltage comprises a DC source, said amplifying means comprising a DC amplifier.

21. The instrument of claim 18 wherein said means for applying a voltage comprises an AC source, said amplifier means comprising an AC amplifier.

22. The instrument of claim 18 wherein said amplifier means comprises a vacuum tube including at least a control grid and a plate electrode, said control grid being connected to said metal electrode and said plate electrode being connected to said indicating means.

23. The instrument of claim 18 wherein said amplifier means comprises a field-effect transistor having a gate electrode, a source electrode, and a drain electrode, said gate electrode being connected to said metal catalyst, said indicating means being connected to one of the remaining electrodes of said field-effect transistor.

References Cited

UNITED STATES PATENTS

| | | | |
|---|---|---|---|
| 2,174,923 | 10/1939 | Labino | 23—254EX |
| 2,219,540 | 10/1940 | Miller | 23—232E |
| 2,300,198 | 10/1942 | Brown | 324—111 |
| 2,420,430 | 5/1947 | Johnson | 23—255E |
| 3,222,599 | 12/1965 | Gewirtz | 330—30DX |
| 3,311,455 | 3/1967 | Robinson | 23—255E |
| 3,392,343 | 7/1968 | Mullins | 330—38FEX |
| 3,111,390 | 11/1963 | Taylor | 23—230BIO |

MORRIS O. WOLK, Primary Examiner

R. M. REESE, Assistant Examiner

U.S. Cl. X.R.

23—254E; 73—27